(12) United States Patent
Dsouza et al.

(10) Patent No.: US 9,823,656 B1
(45) Date of Patent: Nov. 21, 2017

(54) METHOD AND SYSTEM FOR AUTOMATICALLY PERFORMING SAFETY OPERATIONS TO PREVENT CRASH OF AN AIRBORNE VEHICLE

(71) Applicant: Wipro Limited, Bangalore (IN)

(72) Inventors: Melwyn Anthony Dsouza, Bangalore (IN); Usman Ali Abdul Rahiman, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/246,269

(22) Filed: Aug. 24, 2016

(30) Foreign Application Priority Data

Jun. 29, 2016 (IN) .............................. 201641022335

(51) Int. Cl.
*G01C 23/00* (2006.01)
*G05D 1/00* (2006.01)
*G07C 5/08* (2006.01)
*G08G 5/00* (2006.01)
*G08G 5/04* (2006.01)

(52) U.S. Cl.
CPC ......... *G05D 1/0061* (2013.01); *G07C 5/0808* (2013.01); *G07C 5/0825* (2013.01); *G08G 5/0013* (2013.01); *G08G 5/04* (2013.01)

(58) Field of Classification Search
CPC .. G05D 1/0061; G07C 5/0808; G07C 5/0825; G08G 5/0013; G08G 5/04
See application file for complete search history.

(56) References Cited

U.S. PATENT DOCUMENTS

| 6,691,956 B1* | 2/2004 | Waterman | B64D 45/0015 244/189 |
| 2002/0158166 A1* | 10/2002 | Lin | B64D 33/02 244/53 B |
| 2003/0067379 A1 | 4/2003 | Riley | |
| 2003/0128122 A1* | 7/2003 | Reynolds | B64D 45/0015 340/573.1 |
| 2003/0144769 A1* | 7/2003 | Meier | B64D 45/0015 701/3 |
| 2003/0225489 A1* | 12/2003 | Tsao | B64C 13/18 701/9 |

(Continued)

*Primary Examiner* — Hussein Elchanti
(74) *Attorney, Agent, or Firm* — Finnegan, Henderson, Farabow, Garrett & Dunner, LLP (57) ABSTRACT

The present subject matter is related to a safety mechanism that comprises method and system for automatically performing safety operations to prevent crash of an airborne vehicle. When there is a deviation of current airborne vehicle path from predefined airborne vehicle path, the airborne vehicle safety system sends a notification to receive authentication of all aircraft operators in the airborne vehicle, as a safety measure. If the authentication is provided, then the airborne vehicle proceeds along the current path, otherwise control of the airborne vehicle is switched from manual control to automatic control that proceeds along the predefined path. Therefore, the airborne vehicle safety system prevents intentional crash or deviation from the current path. Further, the airborne vehicle safety system unlocks cockpit door of the airborne vehicle when authentication is not received from the aircraft operator in cockpit so that necessary measures can be taken to prevent the crash.

20 Claims, 4 Drawing Sheets

(56) References Cited

U.S. PATENT DOCUMENTS

| | | | |
|---|---|---|---|
| 2004/0021581 A1* | 2/2004 | Weigl | B64D 45/0015 340/945 |
| 2004/0078118 A1* | 4/2004 | Binder | B60R 25/252 701/1 |
| 2005/0065667 A1* | 3/2005 | Weineck | B64D 45/0015 701/3 |
| 2005/0209745 A1* | 9/2005 | Watzl | B64D 45/0015 701/9 |
| 2007/0050101 A1 | 3/2007 | Sacle et al. | |
| 2017/0190335 A1* | 7/2017 | Gillett | B60W 50/082 |

* cited by examiner

METHOD AND SYSTEM FOR AUTOMATICALLY PERFORMING SAFETY OPERATIONS TO PREVENT CRASH OF AN AIRBORNE VEHICLE

TECHNICAL FIELD

The present subject matter is related in general to a safety mechanism for airborne vehicles, and more particularly, but not exclusively to a method and a system for automatically performing one or more safety operations to prevent crash of an airborne vehicle.

BACKGROUND

An airborne vehicle is a machine that will fly by gaining support from the air. Generally, unfortunate situations arise when the airborne vehicles, for example, aircraft crash due to bad weather conditions, improper signals, insufficient fuel etc. But there are scenarios where airborne vehicles may be hijacked with a motive of deviating path of the airborne vehicle or with a motive of crashing the airborne vehicle and kill passengers of the airborne vehicle. Usually in such scenarios, one of the pilots of the airborne vehicle may deviate the airborne vehicle from the path or change some parameters of the airborne vehicle like speed, altitude etc. to crash the airborne vehicle.

Existing techniques detect deviation in airborne vehicle path and display the deviation to the pilots. Further, the existing techniques detect trajectory errors of the airborne vehicle and indicate it to the pilots to save the airborne vehicle from crashing against any external threat. As an example, the external threats may be a mountain, a building, another airborne vehicle etc.

But one of the issues in the existing systems is that, in absence of co-pilot of the airborne vehicle, the other pilot may take control of the airborne vehicle and deviate the airborne vehicle from the path or crash the airborne vehicle at any given point of time. Secondly, one of the pilots can lock the cockpit door from inside while the other pilot is outside the cockpit, thereby creating a helpless situation that leads to loss of life.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for automatically performing one or more safety operations to prevent crash of an airborne vehicle. An airborne vehicle safety system detects a deviation level of current airborne vehicle path from predefined airborne vehicle path. Upon detecting the deviation level, if the deviation level is greater than a predefined deviation level, the airborne vehicle safety system sends a notification and requests for authentication from each of the plurality of airborne vehicle operators present in the airborne vehicle, as a safety measure. If the authentication is provided, then deviation is ignored and the airborne vehicle safety system allows the airborne vehicle to proceed along the current airborne vehicle path. If the authentication is not provided, the airborne vehicle safety system switches control of the airborne vehicle from manual control to automatic control that proceeds along the predefined airborne vehicle path. Therefore, the airborne vehicle safety system prevents intentional crash or deviation of current airborne vehicle path. Further, the airborne vehicle safety system unlocks cockpit door of the airborne vehicle when each of the plurality of airborne vehicle do not provide authentication within a predefined time interval through a dashboard inside a cockpit of the airborne vehicle, so that necessary measures can be taken to prevent crash of the airborne vehicle.

Accordingly, the present disclosure provides a method for automatically performing one or more safety operations to prevent crash of an airborne vehicle. The method comprises detecting, by an airborne vehicle safety system, a deviation level in current airborne vehicle path from a predefined airborne vehicle path based on real-time data related to the current airborne vehicle path and stored data related to the predefined airborne vehicle path. Further, the airborne vehicle safety system dynamically provides a notification about the deviation level to each of plurality of airborne vehicle operators present in the airborne vehicle if the deviation level is greater than a predefined deviation level. Finally, the airborne vehicle safety system switches manual control of the airborne vehicle into automatic control of the airborne vehicle if authentication for the notification is not received from each of the plurality of airborne vehicle operators within a predefined time interval.

Further, the present disclosure comprises an airborne vehicle safety system for automatically performing one or more safety operations to prevent crash of an airborne vehicle. The airborne vehicle safety system comprises a processor and a memory communicatively coupled to the processor, wherein the memory stores the processor-executable instructions, which, on execution, causes the processor to detect a deviation level in current airborne vehicle path from a predefined airborne vehicle path. The deviation level is detected based on real-time data related to the current airborne vehicle path and stored data related to the predefined airborne vehicle path. Further, the processor provides dynamically, a notification about the deviation level to each of plurality of airborne vehicle operators present in the airborne vehicle if the deviation level is greater than a predefined deviation level. Finally, the processor switches manual control of the airborne vehicle into automatic control of the airborne vehicle if authentication for the notification is not received from each of the plurality of airborne vehicle operators within a predefined time interval.

Further, the present disclosure comprises a non-transitory computer readable medium including instructions stored thereon that when processed by at least one processor causes an airborne vehicle safety system to perform operations comprising detecting a deviation level in a current airborne vehicle path from a predefined airborne vehicle path based on real-time data related to the current airborne vehicle path and stored data related to the predefined airborne vehicle path. The instructions further cause the processor to provide dynamically, a notification about the deviation level to each of plurality of airborne vehicle operators present in the airborne vehicle if the deviation level is greater than a predefined deviation level. Finally, the instructions further cause the processor to switch manual control of the airborne vehicle into automatic control of the airborne vehicle if authentication for the notification is not received from each of the plurality of airborne vehicle operators within a predefined time interval.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for automatically performing one or more safety operations to prevent crash of an airborne vehicle. The airborne vehicle proceeds along a predefined airborne vehicle path based on one or more parameters. The one or more parameters are altitude of the airborne vehicle, speed of the airborne vehicle, route of the airborne vehicle, GPS data of the airborne vehicle, direction of the airborne vehicle. An airborne vehicle safety system receives both stored data related to the predefined airborne vehicle path and real-time data related to current airborne vehicle path and compares the real-time data with the stored data. In an embodiment, the stored data may comprise data associated with the one or more parameters and the real-time data may comprise data associated with the one or more parameters in real-time. If the real-time data deviates from the stored data, the airborne vehicle safety system detects the deviation level in the current airborne vehicle path from the predefined airborne vehicle path. Upon detecting the deviation level, immediately the airborne vehicle safety system sends a notification related to the deviation level to each of plurality of airborne vehicle operators present in the airborne vehicle and requests for authentication. If each of the plurality of airborne vehicle operators provides authentication for the notification, the airborne vehicle safety system allows the plurality of airborne vehicle operators to fly the airborne vehicle along the current airborne vehicle path. If the authentication is not received from each of the plurality of airborne vehicle operators or if the authentication is not successful, the airborne vehicle safety system switches manual control of the airborne vehicle to automatic control of the airborne vehicle. By switching from the manual control to the automatic control, the airborne vehicle safety system seizes the opportunity to intentionally crash the airborne vehicle or intentionally deviate from the current airborne vehicle path of the airborne vehicle. The automatic control follows the predefined airborne vehicle path. Further, the airborne vehicle safety system unlocks cockpit door of the airborne vehicle to take necessary measures.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
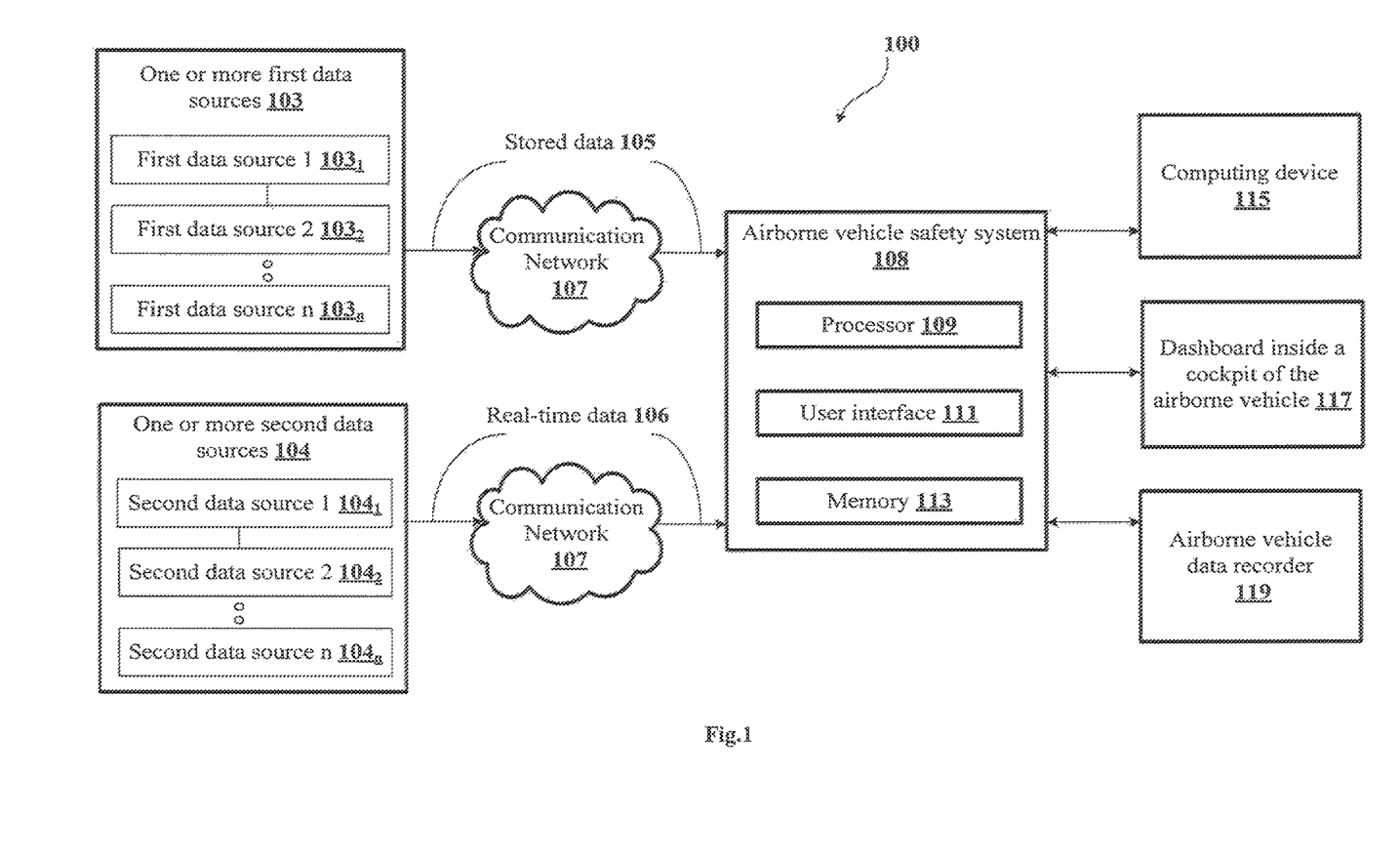
FIG. 1 shows an exemplary architecture of a method for automatically performing one or more safety operations to prevent crash of an airborne vehicle in accordance with some embodiments of the present disclosure.

FIG. 1 shows an exemplary architecture a method for automatically managing control mode of an airborne vehicle to optimize safety of the airborne vehicle in accordance with some embodiments of the present disclosure.

The architecture 100 comprises one or more first data sources, first data source 1 $103_1$ to first data source n $103_n$ (collectively referred to as one or more first data sources 103), one or more second data sources, second data source 1 $104_1$ to second data source n $104_n$ (collectively referred to as one or more second data sources 104), a communication network 107, an airborne vehicle safety system 108, a computing device 115, a dashboard inside a cockpit of the airborne vehicle 117 and an airborne vehicle data recorder 119.

In an embodiment, the airborne vehicle may be any vehicle having the capability to fly, a vehicle that follows a predefined path to reach from one point to another and a vehicle that comprises an automatic control mode for controlling the vehicle. As an example, the airborne vehicle may include, but not limited to, an airplane and a jet engine. In an embodiment, the predefined airborne vehicle path is based on one or more parameters. As an example, the one or more parameters may include, but not limited to, altitude of the airborne vehicle, speed of the airborne vehicle, route of the airborne vehicle, Global Positioning System (GPS) data of the airborne vehicle, direction of the airborne vehicle and other related airborne vehicle path data. The one or more first data sources 103 may be configured to provide stored data 105 related to the predefined airborne vehicle path, through the communication network 107, to the airborne vehicle safety system 108. As an example, the one or more first data sources 103 may include, but not limited to, an airborne vehicle path system and the GPS. The stored data 105 may comprise data associated with the one or more parameters. In an embodiment, the communication network 107 may include wireless communication network.

The one or more second data sources 104 may be configured to provide real-time data 106 related to a current airborne vehicle path, through the communication network 107, to the airborne vehicle safety system 108. As an example, the one or more second data sources 104 may include, but not limited to, an airborne vehicle navigation device, an air traffic control system and the GPS. In an embodiment the current airborne vehicle path is based on the one or more parameters and therefore the real-time data 106 may comprise data associated with the one or more parameters in real-time. The airborne vehicle safety system 108 is configured within the airborne vehicle. Further, the airborne vehicle safety system 108 is associated with the dashboard inside the cockpit of the airborne vehicle 117 and the airborne vehicle data recorder 119.

The airborne vehicle safety system 108 comprises a processor 109, a user interface 111 and a memory 113. The user interface 111 receives the stored data 105 from the one or more first data sources 103. Upon receiving the stored data 105 from one or more first data sources 103, plurality of airborne vehicle operators of the airborne vehicle start the airborne vehicle using manual control of the airborne vehicle. As an example, the plurality of airborne vehicle operators may include, but not limited to flying crew of the airborne vehicle i.e. pilots of the airborne vehicle. As the airborne vehicle moves, the user interface 111 receives the real-time data 106 from the one or more second data sources 104. Further, upon receiving the real-time data 106, the processor 109 dynamically compares the real-time data 106 with the stored data 105. Upon comparing the real-time data 106 with the stored data 105, the processor 109 detects if there is a deviation of the real-time data 106 from the stored data 105. If the deviation is detected, the processor 109 thereby detects a deviation level caused in the current airborne vehicle path from the predefined airborne vehicle path due to the deviation. If the deviation level is above a predefined deviation level, then the processor 109 dynamically sends a notification about the deviation level to each of the plurality of airborne vehicle operators. In an embodiment, the predefined deviation level is configurable based on requirement of the airborne vehicle. In an embodiment, the notification is provided to the dashboard inside the cockpit of the airborne vehicle 117 and displayed on a display interface of the dashboard inside the cockpit of the airborne vehicle 117. Further, the notification is transmitted to the computing device 115 associated with each of the plurality of airborne vehicle operators and the notification is displayed on a display interface of the computing device 115. As an example, the computing device 115 may include, but not limited to, a mobile, a tablet, a smart watch, a pager and a laptop. The computing device 115 must be present with each of the plurality of airborne vehicle operators at any given point of time. Upon sending the notification, the processor 109 requests for authentication of each of the plurality of aircraft operators for the deviation level detected in the current airborne vehicle path from the predefined airborne vehicle path.

Upon receiving the notification, each of the plurality of airborne vehicle operators should provide authentication to proceed with the current airborne vehicle path, within a predefined time interval. The predefined time interval for each of the plurality of airborne vehicle operators to provide authentication may be set during configuration of the airborne vehicle safety system 108. In an embodiment, the predefined time interval may be varied based on requirements associated with the airborne vehicle. As an example, consider the airborne vehicle comprises 2 pilots for flying the airborne vehicle and the predefined time interval for both the pilots to provide the authentication is 2 minutes from the time the notification is received. The authentication should be provided by both the pilots within 2 minutes from the time the notification is received to continue to fly in the current airborne vehicle path. In an embodiment, authentication may include, but not limited to, biometric authentication and password authentication. Biometric authentication is performed based on unique biological characteristics of each of the plurality of airborne vehicle operators. As an example, the unique biological characteristics may include, but not limited to, fingerprint characteristics, retina characteristics, facial characteristics and Deoxyribonucleic Acid (DNA) characteristics. Password authentication is performed based on a password provided by each of the plurality of airborne vehicle operators. As an example, the password may include, but not limited to, character based password and pattern based password. As an example, characters of the character based password may be alphabets, numbers or combination of alphabets and numbers. In an embodiment, the authentication can be provided by each of the plurality of airborne vehicle operators through the dashboard inside the cockpit of the airborne vehicle 117 or through the computing device 115. If the authentication is received from each of the plurality of airborne vehicle operators within the predefined time interval, the processor 109 understands that each of the plurality of airborne vehicle operators is in agreement to proceed with the current airborne vehicle path. The processor 109 then allows the plurality of airborne vehicle operators to proceed along the current airborne vehicle path using the manual control of the airborne vehicle. Upon allowing the plurality of airborne vehicle operators to proceed along the current airborne vehicle path, the processor 109 checks if the authentication received from each of the plurality of airborne vehicle operators is through the dashboard inside the cockpit of the airborne vehicle 117. If the authentication from each of the plurality of airborne vehicle operators is not received from the dashboard inside the cockpit of the airborne vehicle 117, then the processor 109 unlocks a cockpit door of the airborne vehicle. In an embodiment, time at which the cockpit door is unlocked may be preconfigured in the airborne vehicle safety system 108.

In an embodiment, if the authentication is not received from each of the plurality of airborne vehicle operators within the predefined time interval, then the processor 109 understands that each of the plurality of airborne vehicle operators are not in agreement with the current airborne vehicle path. Immediately, the processor 109 switches from the manual control of the airborne vehicle to automatic control of the airborne vehicle. The automatic control of the airborne vehicle seizes the manual control of the airborne vehicle. Further, the automatic control of the airborne vehicle stops the airborne vehicle from proceeding along the current airborne vehicle path and takes the predefined airborne vehicle path. Further since authentication from each of the plurality of airborne vehicle operators is not received, the processor 109 unlocks the cockpit door. In an embodiment, the airborne vehicle data recorder 119 records one or more transactions related to the current airborne vehicle path and authentication information dynamically.

Scenario-1

Consider a scenario comprising an airplane which is one of the airborne vehicles. Starting location of the airplane is "ABC" and destination location of the airplane is "XYZ". The airplane comprises two airborne vehicle operators i.e. 2 pilots who can fly the airplane namely "P" and "Q". The airplane is started by the pilots "P" and "Q" from the starting location "ABC" using the manual control based on the stored data 105. At a given instance, when the airplane is in air, pilot "Q" goes out of the cockpit. Meanwhile, the pilot "P" with an intention of crashing the airplane locks the cockpit door and changes the direction of the airplane towards right though the stored data 105 indicates the pilots to go towards left. Immediately based on the real-time data 106 received, the airborne vehicle safety system 108 detects a deviation level in the current airborne vehicle path from the predefined airborne vehicle path. When the deviation level is beyond a predefined deviation level, the airborne vehicle safety system 108 sends a notification about the deviation level to both the pilots "P" and "Q" and requests for authentication from both the pilots "P" and "Q". The predefined time interval set for receiving the authentication from both the pilots "P" and "Q" is 2 minutes. The pilot "P" provides authentication from the dashboard inside the cockpit of the airborne vehicle 117 within the predefined time interval but pilot "Q" who is out of the cockpit receives the notification in his smart watch but does not provide authentication within the predefined time interval. The airborne vehicle safety system 108 understands that pilot "Q" is not in agreement with the current airborne vehicle path. Therefore, the airborne vehicle safety system 108 switches from the manual control to the automatic control. The automatic control seizes the manual control to stop the pilot "P" from crashing the airplane and follows the predefined airborne vehicle path to reach the destination location "XYZ". Further, the airborne vehicle safety system 108 also unlocks the cockpit door simultaneously so that pilot "Q" can enter into the cockpit and take necessary measures against pilot "P". In an embodiment, if the pilot "Q" who is out of the cockpit receives the notification in his smart watch and provides authentication within the predefined time interval. The airborne vehicle safety system 108 understands that the pilot "Q" is in agreement with the current airborne vehicle path and allows proceeding along the current airborne vehicle path retaining the manual control. Further, since the authentication of the pilot "Q" was received from the smart watch and not from the dashboard inside the cockpit of the airborne vehicle 117, the airborne vehicle system 108 understands that the pilot "Q" is outside the cockpit and unlocks the cockpit door.

Scenario-2

Consider a scenario comprising an airplane which is one of the airborne vehicles. Starting location of the airplane is "ABC" and destination location of the airplane is "XYZ". The airplane comprises two airborne vehicle operators i.e. 2 pilots who can fly the airplane namely "P" and "Q". The airplane is started by the pilots "P" and "Q" from the starting location "ABC" using the manual control based on the stored data 105. At a given instance, when the airplane is in the air, the pilot "P" may intentionally reduce the altitude of the airplane with an intention to crash the airplane. Though the current airborne vehicle path has not changed, the real-time data 106 indicates change in the altitude when compared to the stored data 105. Dynamically, the GPS indicates the presence of a high rise building in the current airborne vehicle path. Therefore, the airborne vehicle safety system 108 will detect that the airplane may crash in the high rise building if it proceeds in the current airborne vehicle path. The airborne vehicle safety system 108 immediately sends a notification about the change in altitude and the presence of the high rise building to both the pilots "P" and "Q" and requests for authentication from both the pilots "P" and "Q". The predefined time interval set for receiving the authentication from both the pilots "P" and "Q" is 2 minutes. The pilot "P" provides authentication from the dashboard inside the cockpit of the airborne vehicle 117 within the predefined time interval as he has the intention to crash the airplane to the high rise building but pilot "Q" does not provide the authentication. The airborne vehicle safety system 108 understands that pilot "Q" is not in agreement with the current airborne vehicle path. Therefore, the airborne vehicle safety system 108 switches from the manual control to the automatic control. The automatic control seizes the manual control to stop the pilot "P" from crashing the airplane and follows the predefined airborne vehicle path to reach the destination location "XYZ", thereby preventing the crash. Further, the airborne vehicle safety system 108 also unlocks the cockpit door so that necessary measures can be taken against pilot "P".

Scenario-3

Consider a scenario comprising an airplane which is one of the airborne vehicles. Starting location of the airplane is "ABC" and destination location of the airplane is "XYZ". The airplane comprises two airborne vehicle operators i.e. 2 pilots who can fly the airplane namely "P" and "Q". The airplane is started by the pilots "P" and "Q" from the starting location "ABC" using the manual control based on the stored data 105. At a given instance, when the airplane is about to land, the pilot "P" may intentionally increase speed of the airplane with an intention to crash the airplane on the land. Though the current airborne vehicle path has not changed, the real-time data 106 indicates change in the speed when compared to the stored data 105. Dynamically, the airborne vehicle safety system 108 will detect that the airplane may crash on the land if it proceeds with the same speed. The airborne vehicle safety system 108 immediately sends a notification about the change in the speed to both the pilots "P" and "Q" and requests for authentication from both the pilots "P" and "Q". The predefined time interval set for receiving the authentication from both the pilots "P" and "Q" is 2 minutes. The pilot "P" provides the authentication from the dashboard inside the cockpit of the airborne vehicle 117 within the predefined time interval as he has the intention to crash the airplane during landing but pilot "Q" does not provide the authentication. The airborne vehicle safety system 108 understands that pilot "Q" is not in agreement with the change in the speed. Therefore, the airborne vehicle safety system 108 switches from the manual control to the automatic control. The automatic control seizes the manual control to stop the pilot "P" from crashing the airplane and follows the speed specified in the stored data 105 to land the airplane thereby preventing the crash. Further, the airborne vehicle safety system 108 also unlocks the cockpit door so that necessary measures can be taken against pilot "P".

Figure 2:
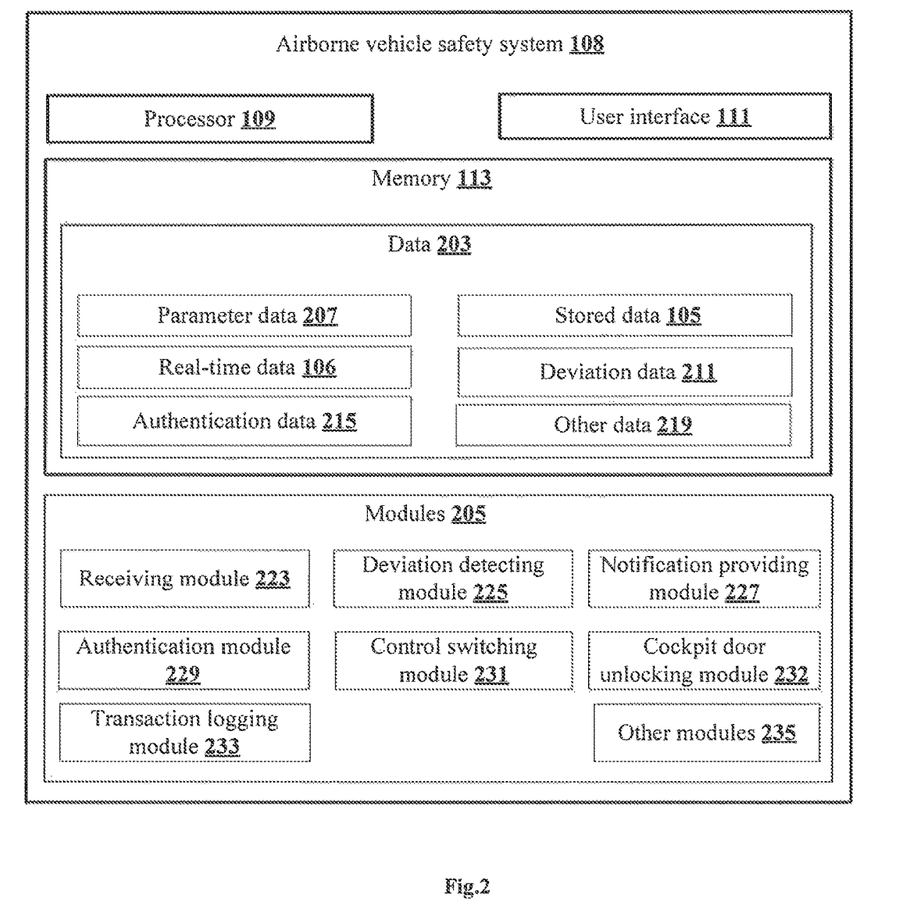
FIG. 2 shows a detailed block diagram of an airborne vehicle safety system for automatically performing one or more safety operations to prevent crash of an airborne vehicle in accordance with some embodiments of the present disclosure.

FIG. 2 shows a detailed block diagram of an airborne vehicle safety system a method for automatically performing one or more safety operations to prevent crash of an airborne vehicle in accordance with some embodiments of the present disclosure.

In one implementation, the airborne vehicle safety system 108 receives data 203 from one or more first data sources 103 and one or more second data sources 104. As an example, the data 203 may be stored in a memory 113 configured in the airborne vehicle safety system 108. In one embodiment, data 203 comprises parameter data 207, stored data 105, real-time data 106, deviation data 211, authentication data 215 and other data 219. In the illustrated FIG. 2, modules 205 are described here in detail.

In one embodiment, the data 203 may be stored in the memory 113 in the form of various data structures. Additionally, the aforementioned data 203 can be organized using data models, such as relational or hierarchical data models. The other data 219 may store data, including temporary data and temporary files, generated by modules 205 for performing the various functions of the airborne vehicle safety system 108.

In an embodiment, the parameter data 207 comprises one or more parameters. As an example, the one or more parameters present in the parameter data 207 may include, but not limited to, altitude of the airborne vehicle, speed of the airborne vehicle, route of the airborne vehicle, Global Positioning System (GPS) data of the airborne vehicle and direction of the airborne vehicle. A predefined airborne vehicle path and a current airborne vehicle path are based on the one or more parameters.

In an embodiment, the stored data 105 is related to the predefined airborne vehicle path. The stored data 105 comprises data associated with the one or more parameters. Further, the stored data 105 is received from one or more first data sources 103.

In an embodiment, the real-time data 106 is related to the current airborne vehicle path. The real-time data 106 comprises data associated with the one or more parameters in real-time. The real-time data 106 is received from one or more second data sources 104.

In an embodiment, the deviation data 211 is related to deviation level detected in the current airborne vehicle path when compared with the predefined airborne vehicle path. Further, the deviation data 211 comprises the predefined deviation level that helps in the detection of the deviation level in the current airborne vehicle path when compared with the predefined airborne vehicle path. In an embodiment, the predefined deviation level is configurable based on requirement of the airborne vehicle.

In an embodiment, the authentication data 215 comprises authentication received from plurality of airborne vehicle operators. The authentication data 215 comprises unique biological characteristics of each of the plurality of airborne vehicle operators. As an example, the unique biological characteristics may include, but not limited to, fingerprint characteristics, retina characteristics, facial characteristics and Deoxyribonucleic Acid (DNA) characteristics. Further, the authentication data 215 comprises password of each of the plurality of airborne vehicle operators. As an example, the password may include, but not limited to, character based password and pattern based password. As an example, characters of the character based password may be alphabets, numbers or combination of alphabets and numbers. Further, the authentication data 215 comprises a predefined time interval before which the authentication should be received from the plurality of airborne vehicle operators. The predefined time interval for each of the plurality of airborne vehicle operators to provide authentication may be set during configuration of the airborne vehicle safety system 108. In an embodiment, the predefined time interval may be varied based on requirements associated with the airborne vehicle.

In an embodiment, the data stored in the memory 113 is processed by the modules 205 of the airborne vehicle safety system 108. The modules 205 may be stored within the memory 113. In an example, the modules 205, communicatively coupled to a processor 109 configured in the airborne vehicle safety system 108, may also be present outside the memory 113 as shown in FIG. 2 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 223, a deviation detecting module 225, a notification providing module 227, an authentication module 229, a control switching module 231, a cockpit door unlocking module 232, a transaction logging module 233 and other modules 235. The other modules 235 may be used to perform various miscellaneous functionalities of the airborne vehicle safety system 108. It will be appreciated that such aforementioned modules 205 may be represented as a single module or a combination of different modules.

In an embodiment, the receiving module 223 receives the stored data 105 from the one or more first data sources 103. As an example, the one or more first data sources 103 may include, but not limited to, an airborne vehicle path system and a Global Positioning System (GPS). Further, the receiving module 223 receives the real-time data 106 from the one or more second data sources 104. As an example, the one or more second data sources 104 may include, but not limited to, an airborne vehicle navigation device, an air traffic control system and the GPS.

In an embodiment, the deviation detecting module 225 detects the deviation level in the current airborne vehicle path from the predefined airborne vehicle path. The deviation detecting module 225 dynamically compares the real-time data 106 with the stored data 105. Upon comparing the real-time data 106 with the stored data 105, the deviation detecting module 225 detects if there is a deviation of the real-time data 106 from the stored data 105. If the deviation is detected, the deviation detecting module 225 thereby detects a deviation level caused in the current airborne vehicle path from the predefined airborne vehicle path due to the deviation and compares it with the predefined deviation level.

In an embodiment, the notification providing module 227 provides a notification to each of the plurality of airborne vehicle operators. If the deviation level is above the predefined deviation level, then the notification providing module 227 dynamically provides the notification about the deviation level to the dashboard inside a cockpit of the airborne vehicle 117 and displayed on a display interface of the dashboard inside the cockpit of the airborne vehicle 117. Further, the notification providing module 227 also transmits the notification to a computing device 115 associated with each of the plurality of airborne vehicle operators and the notification is displayed on a display interface of the computing device 115. The computing device 115 must be present with each of the plurality of airborne vehicle operators at any given point of time.

In an embodiment, the authentication module 229 requests for authentication of each of the plurality of aircraft operators for the deviation level detected in the current airborne vehicle path from the predefined airborne vehicle path within the predefined time interval. The authentication can be provided by each of the plurality of airborne vehicle operators through the dashboard inside the cockpit of the airborne vehicle 117 or through the computing device 115. In an embodiment, authentication mechanism used to authenticate may include, but not limited to, the biometric authentication and the password authentication. If the authentication is received from each of the plurality of airborne vehicle operators, the authentication module 229 understands that each of the plurality of airborne vehicle operators is in agreement to proceed with the current airborne vehicle path. The authentication module 229 then allows the plurality of airborne vehicle operators to proceed along the current airborne vehicle path using the manual control of the airborne vehicle.

In an embodiment, the control switching module 231 switches from the manual control of the airborne vehicle to automatic control of the airborne vehicle if the authentication is not received from the predefined time interval. The automatic control of the airborne vehicle seizes the manual control of the airborne vehicle. Further, the automatic control of the airborne vehicle stops the airborne vehicle from proceeding along the current airborne vehicle path and takes the predefined airborne vehicle path.

In an embodiment, the cockpit door unlocking module 232, unlocks a cockpit door of the airborne vehicle. If the authentication from each of the plurality of airborne vehicle operators is received, but not from the dashboard inside the cockpit of the airborne vehicle 117, then the cockpit door unlocking module 232 unlocks the cockpit door of the airborne vehicle. In an embodiment, at what time the cockpit door should be unlocked may be preconfigured in the airborne vehicle safety system 108. In another embodiment, if the authentication is not received from each of the plurality of airborne vehicle operators, then also the cockpit door unlocking module 232 unlocks the cockpit door.

In an embodiment, the transaction logging module 233 records one or more transactions related to the current airborne vehicle path and authentication information dynamically in an airborne vehicle data recorder 119 associated with the airborne vehicle safety system 108.

Figure 3:
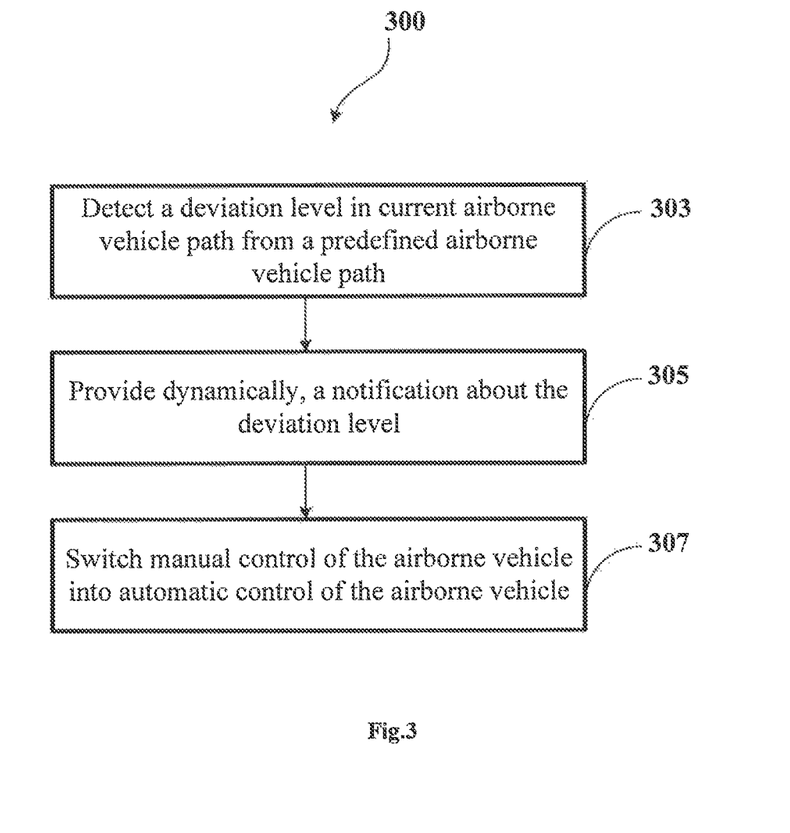
FIG. 3 illustrates a flowchart showing a method for automatically performing one or more safety operations to prevent crash of an airborne vehicle in accordance with some embodiments of the present disclosure.

FIG. 3 illustrates a flowchart a method for automatically performing one or more safety operations to prevent crash of an airborne vehicle in accordance with some embodiments of the present disclosure.

As illustrated in FIG. 3, the method 300 comprises one or more blocks illustrating a method for automatically performing one or more safety operations to prevent crash of an airborne vehicle. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 303, a deviation level in current airborne vehicle path from a predefined airborne vehicle path is detected. In an embodiment, the processor 109 receives stored data 105 from the one or more first data sources 103. The stored data 105 is related to the predefined airborne vehicle path which is based on one or more parameters. Therefore, the stored data 105 is data associated with the one or more parameters. Further, the processor 109 receives real-time data 106 from the one or more second data sources 104. The real-time data 106 is related to the current airborne vehicle path which is based on the one or more parameters. The real-time data 106 is data associated with the one or more parameters in real-time. Upon receiving the stored data 105 and the real-time data 106, the processor 109 dynamically compares the real-time data 106 with the stored data 105. Upon comparing the real-time data 106 with the stored data 105, the processor 109 detects if there is a deviation of the real-time data 106 from the stored data 105. If the deviation is detected, the processor 109 thereby detects a deviation level caused in the current airborne vehicle path from the predefined airborne vehicle path due to the deviation and compares it with the predefined deviation level.

At block 305, a notification related to the deviation level is provided dynamically. In an embodiment, if the deviation level is above the predefined deviation level, then the processor 109 dynamically provides the notification about the deviation level to each of the plurality of airborne vehicle operators. The notification is provided to dashboard inside the cockpit of the airborne vehicle 117 and displayed on a display interface of the dashboard inside the cockpit of the airborne vehicle 117. Further, the notification providing module 227 is also transmitted to a computing device 115 associated with each of the plurality of airborne vehicle operators. The notification is displayed on a display interface of the computing device 115.

At block 307, manual control of the airborne vehicle is switched into automatic control of the airborne vehicle. In an embodiment, the processor 109 requests for authentication of each of the plurality of aircraft operators for the notification within a predefined time interval. Upon receiving the authentication from each of the plurality of aircraft operators within the predefined time interval, the airborne vehicle safety system 108 allows the plurality of airborne vehicle operators to continue to fly along the current airborne vehicle path using the manual control of the airborne vehicle. In an embodiment, authentication mechanism used to authenticate may include, but not limited to, a biometric authentication and a password authentication. If the authentication is not received from each of the plurality of airborne vehicle operators within the predefined time interval, the processor 109 switches from the manual control of the airborne vehicle to automatic control of the airborne vehicle. The automatic control of the airborne vehicle seizes the manual control of the airborne vehicle and takes the predefined airborne vehicle path. Further, the processor 109 unlocks the cockpit door of the airborne vehicle to perform one or more necessary measures.

Figure 4:
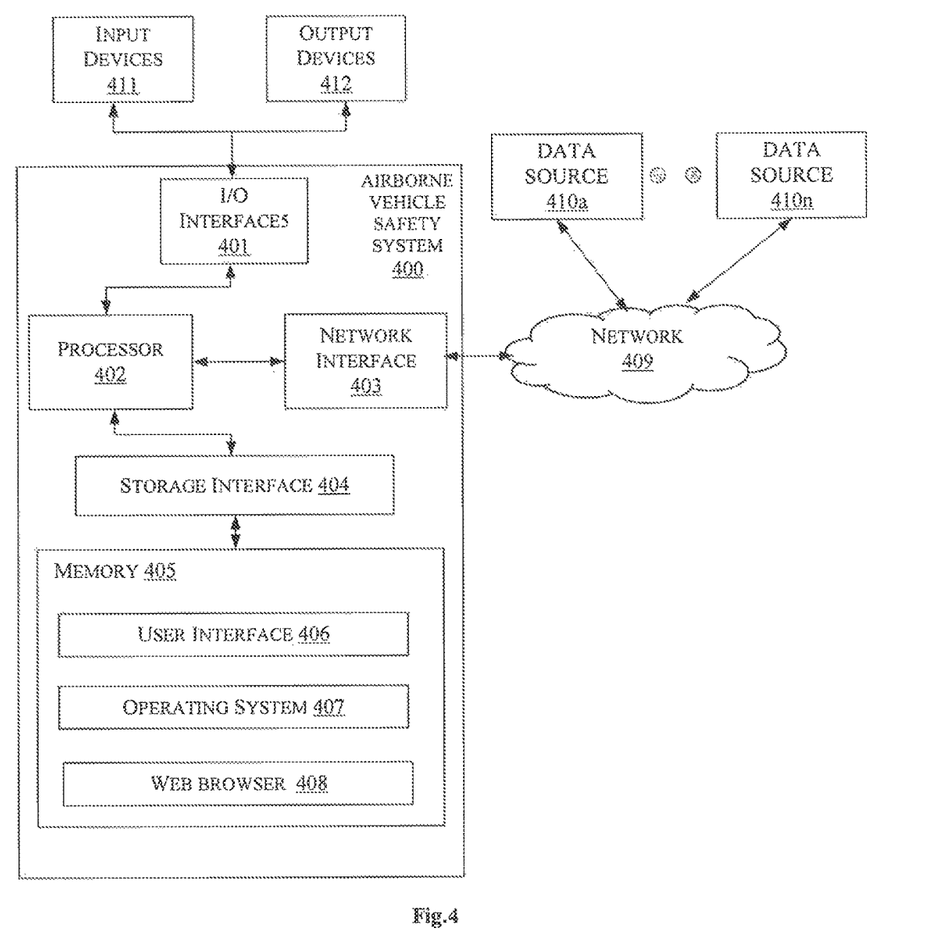
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the airborne vehicle safety system 400 is used for automatically performing one or more safety operations to prevent crash of an airborne vehicle. The airborne vehicle safety system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the airborne vehicle safety system 400 may communicate with one or more I/O devices (411 and 412).

In some embodiments, the processor 402 may be disposed in communication with a communication network 409 via a network interface 403. The network interface 403 may communicate with the communication network 409. The one or more data sources 410 (a . . . n) communicate with the airborne vehicle safety system 400 through wireless communication network. The one or more data sources 410 (a, . . . , n) may include, but not limited to, an airborne vehicle path system, a Global Positioning System (GPS), an airborne vehicle navigation device and an air traffic control system.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, airborne vehicle safety system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the airborne vehicle safety system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the airborne vehicle safety system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the airborne vehicle safety system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the airborne vehicle safety system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the airborne vehicle safety system 400 may implement a mail client stored program component. The mail client may be a mail viewing application, such as Apple-Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein In an embodiment, the present disclosure provides a method for automatically performing one or more safety operations to prevent crash of an airborne vehicle.

The present disclosure provides a feature wherein an intended crash of the airborne vehicle can be avoided.

The present disclosure provides a feature wherein the deviation of the current airborne vehicle path from predefined path can be detected and thereby switch manual control of the airborne vehicle to automatic control of the airborne vehicle to take the predefined airborne vehicle path without deviating.

The present disclosure provides a feature wherein cockpit door of the airborne vehicle will open automatically upon switching to the automatic control which helps in taking necessary measures against the pilot who intended to crash the airborne vehicle.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for automatically performing one or more safety operations to prevent crash of an airborne vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 103 | One or more first data sources |
| 104 | One or more second data sources |
| 105 | Stored data |
| 106 | Real-time data |
| 107 | Communication network |
| 108 | Airborne vehicle safety system |
| 109 | Processor |
| 111 | User interface |
| 113 | Memory |
| 115 | Computing device |
| 117 | Dashboard inside a cockpit of the airborne vehicle |
| 119 | Airboine vehicle data recorder |
| 203 | Data |
| 205 | Modules |
| 207 | Parameter data |
| 211 | Deviation data |
| 215 | Authentication data |
| 219 | Other data |
| 223 | Receiving module |
| 225 | Deviation detecting module |
| 227 | Notification providing module |
| 229 | Authentication module |
| 231 | Control switching module |
| 232 | Cockpit door unlocking module |
| 233 | Transaction logging module |
| 235 | Other modules |

What is claimed is:

1. A method for automatically performing one or more safety operations to prevent crash of an airborne vehicle, the method comprising:
    detecting, by an airborne vehicle safety system 108, a deviation level in a current airborne vehicle path from a predefined airborne vehicle path based on real-time data 106 related to the current airborne vehicle path and stored data 105 related to the predefined airborne vehicle path;
    providing, by the airborne vehicle safety system 108, dynamically, a notification about the deviation level to each of plurality of airborne vehicle operators present in the airborne vehicle if the deviation level is greater than a predefined deviation level; and
    switching, by the airborne vehicle safety system 108, manual control of the airborne vehicle into automatic control of the airborne vehicle if authentication for the notification is not received from each of the plurality of airborne vehicle operators within a predefined time interval.

2. The method as claimed in claim 1, wherein detecting the deviation level comprises:
    receiving, by the airborne vehicle safety system 108, the real-time data 106 from one or more second data sources 104 associated with the airborne vehicle safety system 108; and comparing, by the airborne vehicle safety system 108, the real-time data 106 with the stored data 105 for detecting the deviation level.

3. The method as claimed in claim 1, wherein the current airborne vehicle path and the predefined airborne vehicle path are based on one or more parameters comprising altitude of the airborne vehicle, speed of the airborne vehicle, route of the airborne vehicle, Global Positioning System (GPS) data of the airborne vehicle, and direction of the airborne vehicle.

4. The method as claimed in claim 1, wherein the stored data 105 is received from one or more first data sources 103 associated with the airborne vehicle safety system 108.

5. The method as claimed in claim 1 further comprises providing instructions to each of the plurality of airborne vehicle operators, by the airborne vehicle safety system 108, to proceed with the current airborne vehicle path if the authentication is received from each of the plurality of the airborne vehicle operators within the predefined time interval.

6. The method as claimed in claim 1, wherein the notification is displayed on a display interface associated with a dashboard inside a cockpit of the airborne vehicle 117.

7. The method as claimed in claim 1, wherein the notification is transmitted to a computing device 115 associated with each of the plurality of airborne vehicle operators for displaying the notification on a display interface of the computing device 115.

8. The method as claimed in claim 1, wherein the authentication is received through at least one of a dashboard inside a cockpit of the airborne vehicle 117 and a computing device 115 associated with each of the plurality of airborne vehicle operators.

9. The method as claimed in claim 8 further comprises unlocking, by the airborne vehicle safety system 108, a cockpit door of the airborne vehicle if the authentication is not received from each of the plurality of airborne vehicle operators within the predefined time interval through the dashboard 117.

10. The method as claimed in claim 1 further comprises recording, by the airborne vehicle safety system 108, one or more transactions related to the current airborne vehicle path and authentication information in an airborne vehicle data recorder 119 associated with the airborne vehicle safety system 108.

11. An airborne vehicle safety system 108 for automatically performing one or more safety operations to prevent crash of an airborne vehicle, the airborne vehicle safety system 108 comprising:
 a processor 109; and
 a memory 113 communicatively coupled to the processor 109, wherein the memory 113 stores the processor-executable instructions, which, on execution, causes the processor 109 to:
  detect a deviation level in a current airborne vehicle path from a predefined airborne vehicle path based on real-time data 106 related to the current airborne vehicle path and stored data 105 related to the predefined airborne vehicle path;
  provide dynamically, a notification about the deviation level to each of plurality of airborne vehicle operators present in the airborne vehicle if the deviation level is greater than a predefined deviation level; and
  switch manual control of the airborne vehicle into automatic control of the airborne vehicle if authentication for the notification is not received from each of the plurality of airborne vehicle operators within a predefined time interval.

12. The airborne vehicle safety system 108 as claimed in claim 11, wherein the processor 109 is configured to detect the deviation level by:
 receiving the real-time data 106 from one or more second data sources 104 associated with the airborne vehicle safety system 108; and
 comparing the real-time data 106 with the stored data 105 for detecting the deviation level.

13. The airborne vehicle safety system 108 as claimed in claim 11, wherein the current airborne vehicle path and the predefined airborne vehicle path are based on one or more parameters comprising altitude of the airborne vehicle, speed of the airborne vehicle, route of the airborne vehicle, Global Positioning System (GPS) data of the airborne vehicle, direction of the airborne vehicle.

14. The airborne vehicle safety system 108 as claimed in claim 11, wherein the stored data 105 is received from one or more first data sources 103 associated with the airborne vehicle safety system 108.

15. The airborne vehicle safety system 108 as claimed in claim 11, wherein the processor 109 is further configured to provide instructions to each of the plurality of airborne vehicle operators to proceed with the current airborne vehicle path if the authentication is received from each of the plurality of the airborne vehicle operators within the predefined time interval.

16. The airborne vehicle safety system 108 as claimed in claim 11, wherein the processor 109 displays the notification on a display interface associated with a dashboard inside a cockpit of the airborne vehicle 117.

17. The airborne vehicle safety system 108 as claimed in claim 11, wherein the processor 109 transmits the notification to a computing device 115 associated with each of the plurality of airborne vehicle operators for displaying the notification on a display interface of the computing device 115.

18. The airborne vehicle safety system 108 as claimed in claim 11, wherein the authentication is received through at least one of a dashboard inside a cockpit of the airborne vehicle 117 and a computing device 115 associated with each of the plurality of airborne vehicle operators.

19. The airborne vehicle safety system 108 as claimed in claim 18, wherein the processor 109 is further configured to unlock a cockpit door of the airborne vehicle if the authentication is not received from each of the plurality of airborne vehicle operators within the predefined time interval through the dashboard 117.

20. A non-transitory computer readable medium including instructions stored thereon that when processed by at least one processor 109 causes an airborne vehicle safety system 108 to perform operations comprising:
 detecting a deviation level in a current airborne vehicle path from a predefined airborne vehicle path based on real-time data 106 related to the current airborne vehicle path and stored data 105 related to the predefined airborne vehicle path;
 providing dynamically, a notification about the deviation level to each of plurality of airborne vehicle operators present in the airborne vehicle if the deviation level is greater than a predefined deviation level; and
 switching manual control of the airborne vehicle into automatic control of the airborne vehicle if authentication for the notification is not received from each of the plurality of airborne vehicle operators within a predefined time interval.

\* \* \* \* \*